United States Patent [19]
Kasper et al.

[11] 3,980,333
[45] Sept. 14, 1976

[54] RESILIENT RAILWAY WHEEL

[76] Inventors: Willi Kasper, Spelbergsfeld 6, Wattenscheid; Helmut Licht, Liebigstr. 1, Bochum, both of Germany

[22] Filed: Sept. 26, 1974

[21] Appl. No.: 509,729

[30] Foreign Application Priority Data
Sept. 29, 1973   Germany............................ 2349107

[52] U.S. Cl....................................... 295/11; 295/7; 295/21
[51] Int. Cl.²...................... B60B 9/14; B60B 17/00; B60C 7/06; B60C 7/14
[58] Field of Search ................. 295/7, 11, 33, 22, 21

[56] References Cited
UNITED STATES PATENTS

| | | | |
|---|---|---|---|
| 8,526 | 11/1851 | Hodge................................... | 295/11 |
| 109,310 | 11/1870 | Farrar.................................... | 295/11 |
| 1,648,413 | 11/1927 | Maas..................................... | 295/11 |
| 1,958,642 | 5/1934 | Rosenberg............................ | 295/22 X |
| 2,548,839 | 4/1951 | Coombes............................... | 295/11 |
| 2,667,767 | 2/1954 | Burrell.................................. | 295/11 X |
| 3,127,211 | 3/1964 | Kordes et al.......................... | 295/11 |

FOREIGN PATENTS OR APPLICATIONS

| | | | |
|---|---|---|---|
| 738,768 | 10/1932 | France.................................. | 295/11 |
| 1,046,755 | 7/1953 | France.................................. | 295/11 |
| 1,103,051 | 5/1955 | France.................................. | 295/11 |
| 1,206,006 | 12/1965 | Germany.............................. | 295/11 |

*Primary Examiner*—Robert J. Spar
*Assistant Examiner*—Howard Beltran
*Attorney, Agent, or Firm*—Haseltine, Lake & Waters

[57] ABSTRACT

A rubber-suspended railway wheel having a highly-prestressed rubber insert embedded in facing annular grooves formed in the wheel rim and in the wheel tire and wherein, in order to restrict the extent of axial movement between the wheel tire and wheel rim, a shoulder of the annular groove of the wheel rim overlaps a shoulder of the annular groove of the wheel tire.

3 Claims, 3 Drawing Figures

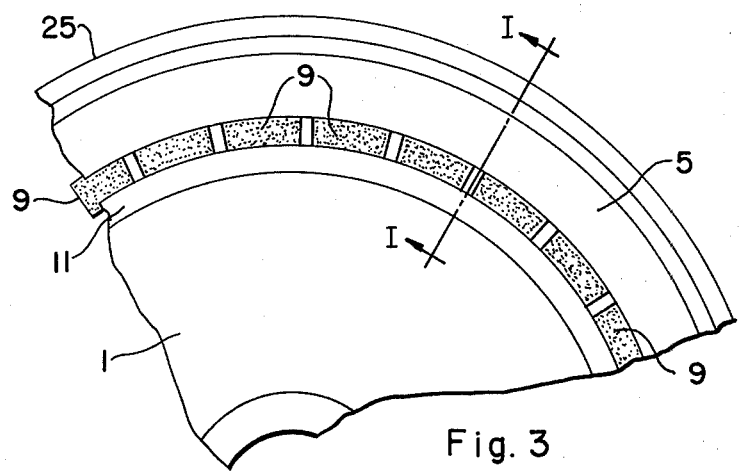
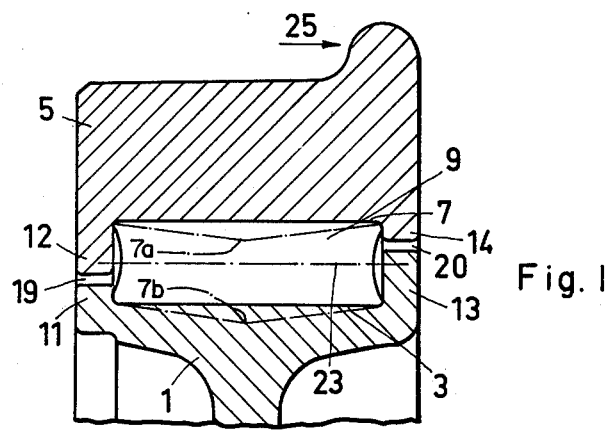
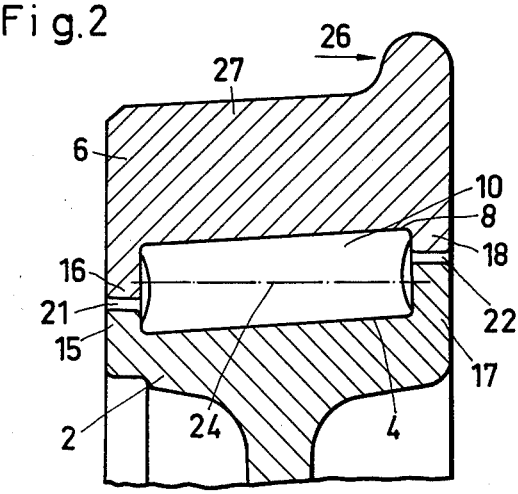
Fig. 3
Fig. 1
Fig. 2

RESILIENT RAILWAY WHEEL

FIELD OF THE INVENTION

The present invention relates to a rubber-suspended railway wheel having a highly-prestressed rubber insert embedded in facing annular grooves formed in the wheel rim and in the wheel tire and wherein, in order to restrict the extent of axial movement between the wheel tire and wheel rim, a shoulder of the annular groove of the wheel rim overlaps a shoulder of the annular groove of the wheel tire.

DISCUSSION OF THE PRIOR ART

In a known railway wheel of this type, the overlapping shoulders are located on one side of the wheel tire. The shoulders are conically shaped in cross-section and their facing surfaces extend parallel to each other while forming a gap therebetween. These shoulders have the task to restrict the axial displacement in one direction between the wheel tire and the wheel base which becomes possible due to the rubber insert. This occurs in a manner whereby, after a predetermined extent of displacement between the wheel tire and wheel rim in an axial direction, the shoulders come into contact. This has the disadvantage that the restriction of the axial displaceability is not limited by means of a force which becomes progressively effective during the axial displacement, but is limited by a sudden impact.

SUMMARY OF THE INVENTION

Accordingly, it is an object of the present invention to provide a rubber-suspended railway wheel which has an improved axial guidance.

This object is inventively attained in a railway wheel of the above-mentioned type in that the overlapping shoulders have one arranged on one side, and the other shoulder on the other side of the rubber insert. Through this arrangement of the shoulders, the axial displaceability of the wheel rim with respect to the wheel tire is restricted by a force which progessively increases with the extent of displacement, inasmuch as the rubber insert which is located between the overlapping shoulder is compressed during the axial displacement.

Inasmuch as, for most railway wheels, the direction of the primary portion of the axially effective forces extend from the tire face side towards the rim face side, in accordance with an embodiment of the invention the shoulders are constructed as continuous rings, and wherein the shoulder carried by the wheel tire is on the side of the tire face while the other shoulder carried by the wheel rim is on the rim face side. Even when in this embodiment of the invention, the restriction of the axial displaceability in the direction of the rim face side is more effective than in the reverse direction, still in comparison with the known railway wheel, due the large circumferential extent of the rubber insert, there is an improvement in the axial guidance also with respect to forces becoming effective a direction towards the tire face side.

In order to give consideration to the side forces caused by the slope of the running surface of the railway wheel, the groove bottom surface of the wheel tire and the groove bottom surface of the wheel rim may have a similarly directed and at least equally large slope as the running surface. From the foregoing, the embodiment of the invention indicates that it also absorbs progressively the side forces produced during motive operation, so as to support the effect of the elevated shoulders.

BRIEF DESCRIPTION OF THE DRAWING

Reference may now be had to the following two illustrative embodiments of the invention, taken in conjunction with the accompanying drawing; in which:

FIG. 1 shows in axial section the radially outer region of a wheel rim and a wheel tire of a railway wheel taken on section line I—I of FIG. 3;

FIG. 2 shows in axial section the radially outer region of a wheel rim and a wheel tire of another embodiment of a railway wheel; and FIG. 3 is a portion of a front view of the railway wheel according to the invention.

DETAILED DESCRIPTION

In both embodiments of the railway wheels illustrated in the drawing, the wheel rim 1, 2 includes an external annular groove 3, 4; whereas the wheel tire 5, 6 is provided with an inner annular groove 7, 8. Within the mutually facing annular grooves 3, 7; 4, 8 there is embedded a rubber insert 9, 10, which is formed of individual rubber blocks. The rubber insert 9, 10, which is constituted of hardened rubber which has been prestressed, supports the wheel tire 5, 6 on the wheel rim 1, 2.

The rubber insert 9, 10 elastically absorbs radial impact forces. In order to facilitate the foregoing, on each side of the insert, 9, 10 there are provided oppositely positioned shoulders 11, 12, 13, 14, 15, 16, 17 and 18 of the annular grooves 3, 4; 7, 8, at a radial spacing or play with respect to each other. The rubber insert 9, 10, however, does not only absorb radial but also axial forces. In order to improve the absorption of these forces, the tire side facing shoulder 12, 16 of wheel tire 5, 6 overlaps the rim side facing shoulder 13, 17 of the wheel rim 2. Since, accordingly, the shoulders 12, 13, 16, 17 extend beyond the shear plane 23, 24 of the rubber insert 9, 10, the rubber insert 9, 10 is compressed upon an axial load occurring on wheel rim 5, 6 in the direction of arrow 25, 26. The force is also progressively absorbed.

In the exemplary embodiment all of the shoulders 12 through 18 are constructed as closed rings. Basically, however, it is possible that the mutually overlapping shoulders 12, 13, 16, 17 be assembled of ring segments which are spaced from each other. In such an instance, the ring segments of the various shoulders are so located so that they interdigitate in a geartooth-like manner, and wherein respectively one of the ring segments carried by the wheel rim located on one side of the rubber insert 9, 10 lies opposite one of the ring segments carried by the wheel tire 5 on the other side of the rubber insert 9, 10, so that these two segments oppositely overlap. A thus constructed railway wheel has a high degree of guidance stability in both axial direction, since the rubber insert is compressed independently of the direction of the axial force. Since in normal operation the railway wheels are, however, loaded primarily in the direction of arrows 25, 26, the shape of a closed ring shoulder as shown in the drawing is that which is preferably selected. Also in this form there is obtained, in comparison with a known railway wheel, an improved side guidance in a direction opposite to arrow 25, 26, inasmuch as the rubber insert 9, 10 is embedded in a much better recess.

The inventive railway wheel facilitates the application of various forms for the annular grooves 3, 4, 7, 8. In the exemplary embodiment of FIG. 1, there is provided for the groove bottom surface of the annular groove 7 a raised curvature 7a, and for the groove bottom surface of the annular groove 3, a curved recess 7b. In the embodiment of FIG. 2, the groove bottom surface of the annular groove 8 and the groove bottom surface of the annular groove 4 are sloped in conformance with the shape of the wheel running surface 27. Through the intermediary of this slope of the annular grooves, 4, 8, the side forces which are generated due to the slope of the running surface 27 are absorbed by the rubber insert 10. In order to provide a uniform loading of the rubber insert, the rubber insert 9, 10 has a shape which is conformed with the configuration of the annular grooves 3, 4, 7 and 8.

While there has been shown what is considered to be the preferred embodiment of the invention, it will be obvious that modifications may be made which come within the scope of the disclosure of the specification.

What is claimed is:

1. In a rubber-suspended railway wheel having a single-piece wheel rim; a single-piece wheel tire annularly encompassing said wheel rim; annular grooves being smooth surfaced and being formed in, respectively, said wheel rim and said wheel tire, said grooves facing each other, said annular groove on said wheel tire and said annular groove on said wheel rim each having only one shoulder adapted to overlap the transversely spaced other shoulder for restricting axial displacement between said wheel tire and said wheel rim; and highly prestressed rubber insert means formed of spaced individual blocks being inserted in said annular grooves at constant intervals, said grooves being transversely curved toward the axis of said wheel for prestressing said rubber insert means, the improvement comprising; one of said overlapping shoulders being located at one side and the other shoulder being located at the other side of said rubber insert means.

2. Railway wheel as claimed in claim 1, said shoulders each forming an annular ring, the shoulder on said wheel tire being on the tire face side and the shoulder on said wheel rim being on the rim face side of said wheel.

3. Railway wheel as claimed in claim 1, said grooves of said wheel tire and wheel rim each having bottom surfaces in conformance and to at least an equal degree as the slope of the trend of the railway wheel tire.

* * * * *